Dec. 19, 1967  S. F. KING  3,359,457
DEVICE FOR OVERLOAD PROTECTION OF ELECTRICAL EQUIPMENT
Filed Oct. 14, 1963  2 Sheets-Sheet 1
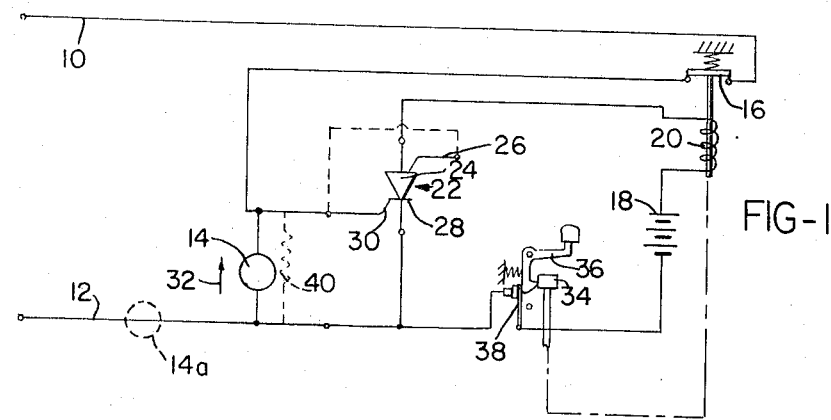
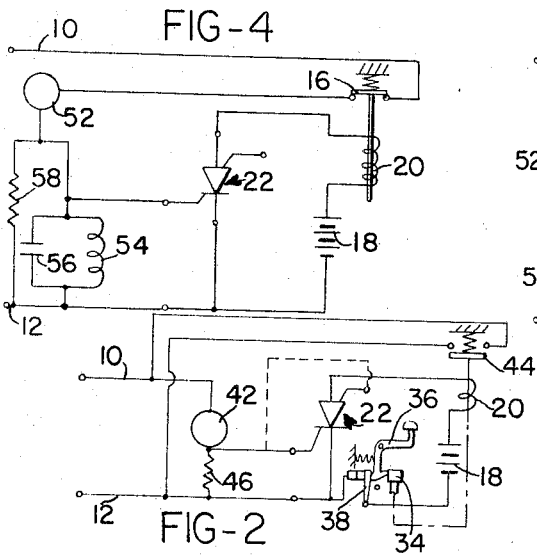
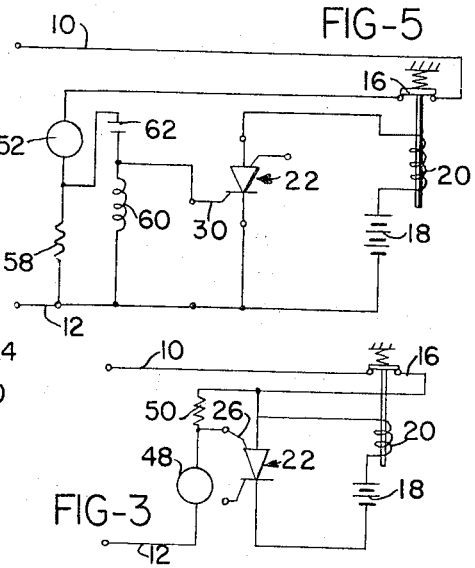
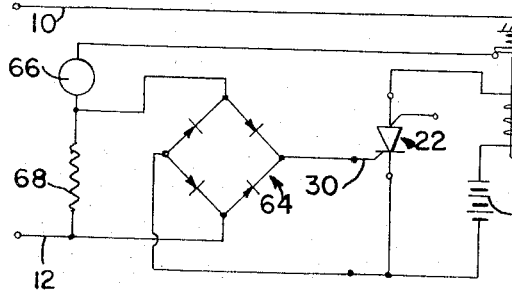
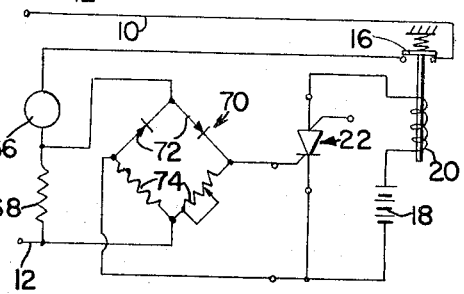
INVENTOR.
STANLEY F. KING
BY Toulmin & Toulmin
ATTORNEYS

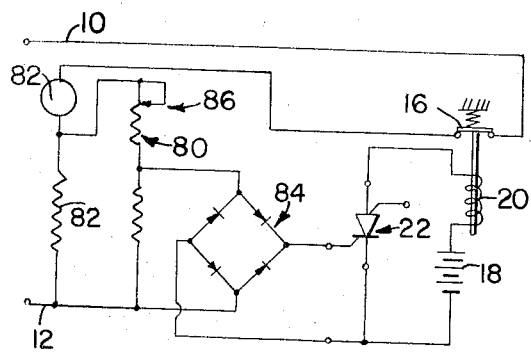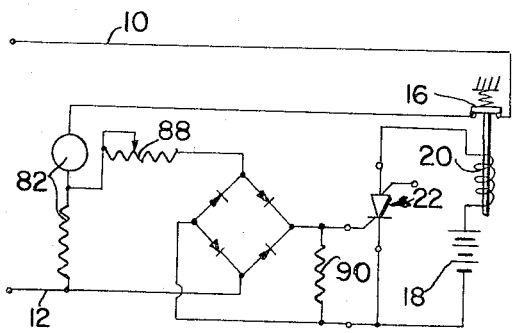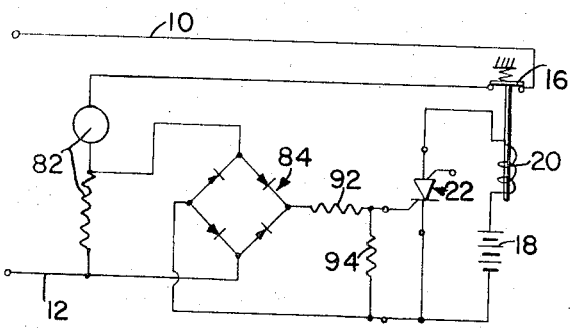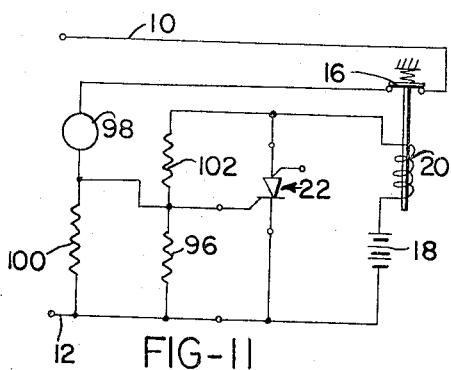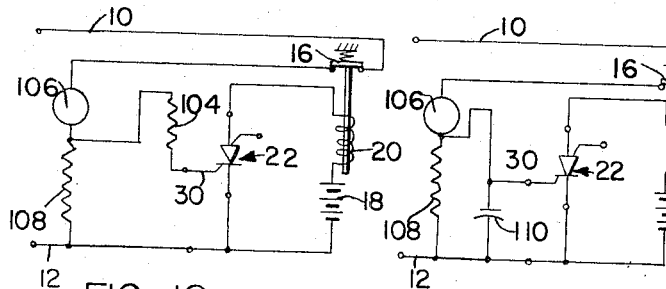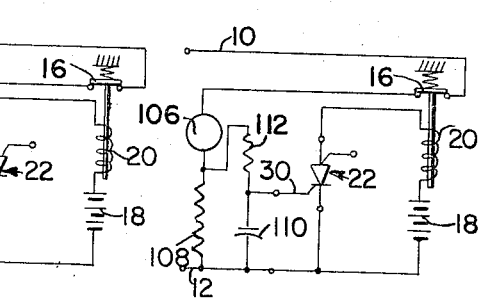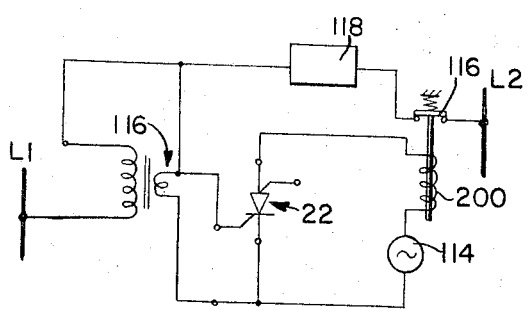
INVENTOR.
STANLEY F. KING
BY
Toulmin & Toulmin
ATTORNEYS United States Patent Office 3,359,457
Patented Dec. 19, 1967

3,359,457
DEVICE FOR OVERLOAD PROTECTION OF ELECTRICAL EQUIPMENT
Stanley F. King, Bluffton, Ohio, assignor to Triplett Electrical Instrument Co., Bluffton, Ohio, a corporation of Ohio
Filed Oct. 14, 1963, Ser. No. 315,883
13 Claims. (Cl. 317—33)

This invention relates to an arrangement for the protection of sensitive electrical equipment, particularly against electrical overloads.

The use of sensitive or related electrical equipment such as meters and the like is wide spread and, furthermore, the use of expensive electrical equipment that can easily be damaged by electrical overload is also wide spread. On account of the expense of replacing such equipment, both as to the equipment itself and the labor in connection with replacing it and the down time of associated equipment, numerous attempts have been made to provide protection for the equipment so that electrical overloads are by-passed from the equipment or so that the circuit to the equipment is interrupted. Heretofore however such equipment has not been completely satisfactory because of slowness of response or lack of reliability, or because of complexity and expense encountered in devising and installing equipment of this nature. Electrically actuated magnetic devices have been attempted, but such devices require critical adjustment or are too slow for reliable protection or tend to deteriorate or become insensitive or unreliable after a period of time.

Electrical devices have been constructed for this purpose but theretofore, electrical protective systems have tended to become excessively complex as well as often requiring an excessive use of stand-by power. Simple electrical arrangements of a less complex nature have, on the other hand, not afforded the high degree of protection necessary for sensitive electrical equipment.

With the foregoing in mind, a primary object of the present invention is to provide an extremely sensitive device for the protection of delicate electrical equipment which is at the same time both simple and reliable.

A further object of this invention is to provide a simple but highly sensitive device for the protection of delicate or easily damaged electrical equipment which is capable of responding extremely rapidly so that it can be used in substantially any situation.

Still another object of this invention is the provision in combination with a sensitive circuit protective device of a highly reliable but non-critical adjustment device to vary the response of the protective element.

A particular object of the present invention is the provision of a protective device of the nature referred to which requires no stand-by power or very little stand-by power, whereby long life can be expected when a stand-by power is provided for example, by batteries.

It is also an object of this invention to provide a protective device of the nature referred to which is broadly applicable to a variety of situations where equipment is to be protected.

These and other objects and advantages of this invention will become more apparent upon reference to the following specification taken in connection with the accompanying drawings, in which:

FIGURE 1 is a diagrammatic representation of a circuit embodying a protective device according to the present invention for an electrical component in which the device opens the circuit when tripped;

FIGURE 2 is a circuit similar to FIGURE 1 but showing how the component would be protected if the current were by-passed therefrom instead of being interrupted as in the case of the FIGURE 1 modification;

FIGURE 3 is a view similar to FIGURE 2 but shows how the trigger element of the protective device can be reversed as to polarity while obtaining the same protective results;

FIGURE 4 is a fragmentary circuit showing how the protective device could be made frequency sensitive by the inclusion in the protective circuit of parallel circuit components making up a resonant circuit;

FIGURE 5 is a view like FIGURE 4 but shows the control circuit with a series resonant branch;

FIGURE 6 is a fragmentary circuit showing use of a rectifier bridge between the power circuit being controlled and the controlling detector circuit;

FIGURE 7 is a view like FIGURE 6 but showing a bridge with two resistance branches therein, at least one of the resistances being adjustable to provide for adjustment of break over voltage to actuate the detector circuit;

FIGURE 8 is a fragmentary view showing the use of a voltage divider between the power circuit and a rectifier bridge leading to the control circuit;

FIGURE 9 is a view similar to FIGURE 8 but showing a different resistance arrangement in the input to the control circuit;

FIGURE 10 shows another voltage divider arrangement similar to that of FIGURES 8 and 9;

FIGURE 11 shows an arrangement wherein a stand-by power source is utilized to bias the trigger control element, or gate, in order to reduce the firing voltage thereof;

FIGURE 12 shows a circuit similar to that of FIGURE 11 but without the bias on the control element;

FIGURE 13 shows an arrangement whereby the operation of the control system can be delayed by including a capacitor in the input side;

FIGURE 14 is a view like FIGURE 13 but showing how a resistance can be included in the input circuit to the control device, and FIGURE 15 is a rather schematic view showing how the arrangement according to the present invention could be made sensitive to the phase difference between the voltage in the power circuit and the voltage in the control circuit.

Referring to the drawings somewhat more in detail, FIGURE 1 shows a circuit having wires 10 and 12. Between the opposite sides of the line is a piece of electrical equipment designated 14 which may be a meter or a relay, or an electric motor or any other sort of piece of electrical equipment which it is desired to protect from overload. In the FIGURE 1 arrangement, protection is provided by a relay blade 16 which is in the load circuit comprising electrical equipment 14. This blade is normally closed.

A control circuit is provided which includes a battery 18, coil 20 for the relay that controls blade 16, and silicon controlled switch generally indicated at 22, all in series. Silicon controlled switch 22 has an anode 24 and an anode gate 26, and has a cathode 28 and a cathode gate 30. In the arrangement illustrated, cathode 28 of the silicon controlled switch is connected to one side of the piece of electrical equipment 14 while the other side of the equipment is connected to cathode gate 30. For a direction of current flow through equipment 14 represented by arrow 32, at a predetermined amount of current flow, the voltage drop across the equipment 14 will be sufficient to fire the silicon controlled switch whereupon it will immediately commence to conduct, thereby energizing coil 20 and causing the switch blade to open, thus to interrupt the circuit through equipment 14.

According to this invention, in order to prevent the draining of power from the stand-by voltage source, in this case the battery 18, the relay is adapted to latch open by engagement of collar 34 thereof by latch 36. When the latch moves into latching engagement with collar 34 it causes opening of a switch 38 in the control circuit, which will thereby interrupt the flow of current through coil 20 and from the stand-by power source, thus protecting the stand-by source from drainage. The control circuit can again be made effective by manually releasing latch 36 and, at this time, if the fault has been cleared from the power circuit, the control circuit will have negligible current flow therein, possibly on the order 1/10 microampere.

The illustrated arrangement is extremely sensitive and I have found that a voltage difference between the terminal and the gate of the silicon controlled switch as little as five tenths of a volt will operate the control circuit. Current flow to the gate on the order of one tenth microampere are sufficient.

It has further been found that leakage current from the stand-by power source will regularly be less than one microampere, and when the stand-by power source is in the form of a battery there can be a continuous flow of current of this much and essentially what is calculated as the full shelf life of the battery will be realized. It is understood of course, that when the silicon controlled switch is fired, the current from the stand-by power source is increased and this is the reason why a latching relay is incorporated wherever continued flow of current in the control circuit is undesirable.

With regard to the speed of response of the described system, this is almost entirely dependent upon the speed of operation of the relay, and it is practical to make relays of this nature to function in a period of time on the order of ten milliseconds. The other circuit components in the control circuit will readily operate well within that period so that the speed of response of the relay can be considered to be the controlling factor with respect to the speed of response of the control system. In most cases, the ten milliseconds referred to which can be obtained, will protect a very delicate electrical instrument and this is, of course, one of the most critical of the protective problems. It will be developed hereinafter that there are applications where it is desired to delay the speed of response of the control system, and this can readily be done. This might be desirable for example, in the case of a piece of electrical equipment less delicate than an extremely delicate instrument and wherein it would be permissible to have momentary overloads and desirable not to trigger the control system unless the overload exceeded a predetermined amount or was greater than a predetermined minimum duration.

There is also indicated in FIGURE 1 the possibility of placing a piece of electrical equipment at position 14a as indicated in dotted outline, and placing between the terminal and gate of the sensitive control element a resistor or the like as indicated in dotted lines at 40, and the same detection of an overload condition could be had. It will thus be evident that the triggered control element could be arranged to be sensitive directly to the load across the piece of electrical equipment being protected or to any other component in the power circuit forming a reliable indication of the load being imposed on equipment 14.

The circuit arrangement of FIGURE 1 shows how the load circuit is interrupted, but it could be that it would be desired to maintain the load circuit while merely protecting the piece of electrical equipment, a meter, for example. This is illustrated in FIGURE 2, which is about the same circuit as FIGURE 1 except that the piece of electrical equipment being protected, indicated at 42, is continuously in the load circuit while blade 44 of the relay operated by the control circuit is connected in by-passing relation to equipment 42 whereby the load circuit is never interrupted. In the FIGURE 2 arrangement a resistor or the like at 46 serially connected with equipment 42 may be utilized to provide the triggering voltage between the terminal and the gate of the sensitive control element, or this element could be connected directly across equipment 42, whichever is preferred.

In FIGURES 1 and 2 I have shown a silicon controlled switch with the cathode gate being used as a trigger, but it will be evident that the anode gate could also be employed to trigger the switch as illustrated in FIGURE 3. In the FIGURE 3 arrangement, either equipment 48 or a circuit element 50 in series therewith is operable to establish the triggering signal between the anode and the anode gate of switch 22 to actuate the relay for initiating protective measures relative to the equipment 48.

In FIGURE 4 there is shown an arrangement in which equipment 52 is protected by relay blade 16 and wherein the triggering voltage is developed across the parallel resonant circuit consisting of inductance 54 and capacitor 56. In this case the triggering of switch 22 would be sensitive to the frequency in the load circuit although it would be evident that the addition of a resistor 58 in parallel with the parallel resonant circuit will provide an arrangement for triggering switch 22 in response to current overload as well.

FIGURE 5 shows the same arrangement as FIGURE 4 except that a series resonant circuit is employed with inductance 60 and a capacitor 62 being connected in series while the gate of switch 22 is connected to a point in the resonant branch between the inductance and capacitor.

FIGURE 6 illustrates an arrangement wherein the triggering voltage for switch 22 is developed across the output terminals of a rectifier bridge 64 interposed between the load circuit and the control circuit.

The voltage supplied to the bridge can be developed either across equipment 66 or across a circuit component 68 in series therewith. The input to the rectifier bridge can either be alternating current or direct current, and the FIGURE 6 arrangement is thus applicable to either an alternating current circuit or a direct current circuit.

Particular features that go with the use of a rectifier bridge are that it allows operation of the control arrangement according to the present invention from direct current regardless of the polarity of the signal and, by employing selected rectifiers, it allows control of the circuit loading and firing level due to the non-linear voltage-current relationship in semi-conductors.

FIGURE 7 shows an arrangement similar to FIGURE 6 except that a bridge 70 is provided having two diodes 72 therein, and in the other legs of the bridge, resistors 74 are provided, one of which is adjustable. This circuit arrangement provides an easy manner of adjusting the control system to the proper break-over voltage for firing switch 22 while at the same time, the circuit is adapted to either direct current or alternating current load circuits.

FIGURE 8 shows the use of a voltage divider arrangement 80 located between the circuit component 82 that develops the triggering voltage at the rectifier bridge 84. The use of a voltage divider 80 permits the control circuit readily to be adapted to load circuits of widely varying voltage. The voltage divider can include adjustable means 86 for effecting precise adjustments in the point at which the control system will respond.

FIGURE 9 shows a circuit similar to that of FIGURE 8 but utilizing a different voltage divider arrangement wherein rheostat 88 is employed in the input side of the divider bridge, whereas a resistor 90 is connected across the output terminals of the bridge and across this latter resistance is developed the triggering signal for switch 22.

FIGURE 10 shows a still different voltage divider arrangement in which the output side of the rectifier bridge 84 has connected thereacross resistances 92 and 94 while only the latter resistance is utilized for developing the triggering signal for switch 22.

The circuit of FIGURE 11 illustrates how a resistance 96 can be connected across the equipment 98 to be protected, or circuit component 100 in series therewith for developing the signal to trigger switch 22. FIGURE 11 also shows however the use of another resistor 102 in series with resistor 96 and connected in closed circuit with coil 20 of the relay and stand-by power source 18. With this arrangement resistor 102 forms a biasing resistor that reduces the triggering voltage of switch 22.

In FIGURE 12 a resistance 104 is included directly in the line leading to gate 30 thereby to control the response of switch 22 to the development of a signal across equipment 106 or circuit component 108 in circuit therewith.

FIGURE 13 illustrates the use of a capacitor 110 connected between the switch terminal of switch 22 and the gate thereof so as to delay the triggering of the switch until a predetermined voltage is developed across the capacitor.

FIGURE 14 shows a circuit arrangement the same as that of FIGURE 13 but with the addition of a resistor 112 in circuit with capacitor 110 and with gate 30 connected to a point between the resistor and the capacitor. This circuit will give a somewhat greater delay than the circuit of the FIGURE 13 arrangement.

FIGURE 15 shows an adaptation of the present invention wherein switch 22 is triggered in response to a predetermined phase difference between the alternating current stand-by power source 114 and the voltage in the load circuit as it may be picked up by current transformer 116. The load circuit is under the control of blade 16 of the relay and the equipment being protected is indicated at 118.

The circuit of FIGURE 15 will operate to energize coil 20 of the relay controlling blade 16 whenever the phase difference of the stand-by voltage source 114, which is impressed across the anode and cathode of switch 22, and the voltage source picked up by the secondary of the current transformer and which is connected between the cathode and the cathode gate, reaches a predetermined amount and in accordance with which a triggering signal will be supplied to switch 22.

It will be understood that in every case, the latching in type relays shown in connection with FIGURES 1 and 2 could be employed, and it will also be understood that in every case the anode gate could be employed to control the silicon controlled switch in plate of the cathode gate merely by selecting the correct polarity as has been shown in FIGURE 3.

The control circuit according to the present invention can be made substantially instantaneously operative as above explained, or it can be delayed by including delay elements in the circuit, particularly, as indicated in FIGURES 13 and 14.

The control system can be directly load responsive as in the case of FIGURE 1, or it can be frequency responsive as in the case of FIGURES 4 and 5, or it can be responsive to a phase difference as in the case of FIGURE 15.

The system can be connected to be sensitive directly to the load across the equipment to be protected, as in FIGURE 1, or it can be sensitive to conditions pertaining to a different component in circuit with the equipment as illustrated in FIGURE 2 for example.

The control system can be connected to interrupt the current flow to the equipment being protected as in the FIGURE 1 modification, or it can by-pass or short circuit or otherwise divert current from the equipment as has been indicated in FIGURE 2.

Because of the extremely wide adaptability of the control arrangement according to the present invention, it will be understood that the several circuits illustrated are merely exemplary and have been supplied to illustrate the use of the control system in various circumstances, but are by no means to be considered exhaustive of all possible applications of the control system.

It will be understood that this invention is susceptible to modifications in order to adapt it to different usages and conditions; and accordingly, it is desired to comprehend such modifications within this invention as may fall within the scope of the appended claims.

I claim:
1. In an electric circuit; an electrical component such as a meter liable to be damaged under abnormal conditions in the circuit and having electric power supplied thereto from a first source of the electric power, a relay having contact means in circuit with said component operable upon actuation of the relay to interrupt the supply of electric power to the component, a separate source of electric power in circuit with the coil of the relay for actuating the relay, a gated semiconductor in series with said relay coil and its source of power to control the actuation of the relay, said semiconductor having a pair of terminals and a gate pertaining to at least one terminal, and sensing element means connected in the circuit supplying said component for developing a triggering signal thereacross in response to a predetermined condition pertaining to the supply of electric power to said component, said gate being connected to one side of said sensing element means, and the terminal corresponding to said gate being connected to the other side of said sensing element means.

2. In an electric circuit; an electrical component such as a meter liable to be damaged under abnormal conditions in the circuit and having electric power supplied thereto from a first source of the electric power, a relay having contact means in circuit with said component operable upon actuation of the relay to interrupt the supply of electric power to the component, a separate source of electric power in circuit with the coil of the relay for actuating the relay, a gated semiconductor in series with said relay coil and its source of power to control the actuation of the relay, said semiconductor having a pair of terminals and a gate pertaining to at least one terminal, and sensing element means connected in the circuit supplying said component for developing a triggering signal thereacross in response to a predetermined condition pertaining to the supply of electric power to said component, said gate being connected to one side of said sensing element means, and the terminal corresponding to said gate being connected to the other side of said sensing element means, said relay contact means being normally closed and in series with said component so as to open the circuit thereto upon actuation of said relay.

3. In an electric circuit; an electrical component such as a meter liable to be damaged under abnormal conditions in the circuit and having electric power supplied thereto from a first source of the electric power, a relay having contact means in circuit with said component operable upon actuation of the relay to interrupt the supply of electric power to the component, a separate source of electric power in circuit with the coil of the relay for actuating the relay, a gated semiconductor in series with said relay coil and its source of power to control the actuation of the relay, said semiconductor having a pair of terminals and a gate pertaining to at least one terminal, and sensing element means connected in the circuit supplying said component for developing a triggering signal thereacross in response to a predetermined condition pertaining to the supply of electric power to said component, said gate being connected to one side of said sensing element means, and the terminal corresponding to said gate being connected to the other side of said sensing element means, said relay contact means being normally open and connected in parallel with said component whereby to by-pass power from said component upon actuation of said relay.

4. In an electric circuit; an electrical component such as a meter liable to be damaged under abnormal conditions in the circuit and having electric power supplied thereto from a first source of the electric power, a relay having contact means in circuit with said component operable upon actuation of the relay to interrupt the supply of electric power to the component, a separate source of electric power in circuit with the coil of the relay for actuating the relay, a gated semiconductor in series with said relay and its source of power to control the actuation of the relay, said semiconductor having a pair of terminals and a gate pertaining to at least one terminal, and sensing element means connected in the circuit supplying said component for developing a triggering signal thereacross in response to a predetermined condition pertaining to the supply of electric power to said component, said gate being connected to one side of said sensing element means, and the terminal corresponding to said gate being connected to the other side of said sensing element means, said semiconductor comprising a silicon controlled switch.

5. In combination; an electrical component of such sensitivity as to be liable to be damaged under abnormal operating conditions, a first source of electric power, and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal.

6. In combination; an electrical component of such sensitivity as to be liable to be damaged under abnormal operating conditions, a first source of electric power, and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said condition corresponding to a condition of overload on said component.

7. In combination; an electrical component of such sensitivity as to be liable to be damaged under abnormal operating conditions, a first source of electric power and first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said third circuit means including rectifier means.

8. In combination; an electrical component of such sensitivity as to be liable to be damaged under abnormal operating conditions, a first source of electric power, and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said third circuit means including circuit components for modifying the triggering signal supplied to the gate and its corresponding terminal from what is received from said first circuit.

9. The combination according to claim 5 wherein said first and second sources are alternating current and said third circuit means is connected to said first circuit via a transformer.

10. In combination; an electrical component of such sensitivity as to be liable to be damaged under abnormal operating conditions, a first source of electric power, and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said third circuit means including time delay means to delay the passage of the signal to said switch.

11. In combination; an electrical component of such sensitivity as to be liable to be damaged under abnormal operating conditions, a first source of electric power and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said second circuit including normally closed contact means of said relay whereby actuation of the relay opens said second circuit, releasable latch means operable to latch the relay in actuated position following triggering of said switch, and a normally open switch in said third circuit held closed by said latch means prior to operation of said latch means to latch said relay in actuated position.

12. In combination; an electrical component of such sensitivity as to be liable to be damaged under abnormal operating conditions, a first source of electric power and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said condition consisting of a predetermined frequency of the said first source.

13. In combination; an electrical component of such sensitivity as to be liable to be damaged under abnormal operating conditions, a first source of electric power and a first circuit connecting said source of power with said electrical component, a relay having contact means in said first circuit operable upon actuation of said relay to interrupt the supply of electric power to said component, said relay having an actuating coil, a second source of electric power, a silicon controlled switch having a pair of terminals and a gate for at least one of said terminals, a second circuit connecting said coil and switch and second source of power in series, a sensing element in said first circuit, and third circuit means connecting said gate of said switch and the corresponding terminal thereof with opposite ends of said sensing element in said first circuit and operable in response to a predetermined electrical condition in said first circuit as sensed by said sensing element to supply a triggering signal between said gate and said corresponding terminal, said third circuit means including inductive and capacitive components whereby the voltage in said third circuit means is a function of the frequency of said first source.

References Cited
UNITED STATES PATENTS

| | | | |
|---|---|---|---|
| 3,158,786 | 11/1964 | Hurtle | 317—33 |
| 3,181,032 | 4/1965 | Myers | 317—33 |
| 3,213,323 | 10/1965 | Circle | 317—33 |
| 3,215,896 | 11/1965 | Shattuck et al. | 317—16 |

MILTON O. HIRSHFIELD, *Primary Examiner.*

R. V. LUPO, *Assistant Examiner.*